(12) United States Patent
Nimmo et al.

(10) Patent No.: US 6,523,665 B2
(45) Date of Patent: Feb. 25, 2003

(54) CONVEYOR ROLLER WITH TAPERED SLEEVE ASSEMBLY

(75) Inventors: Frank D. Nimmo, Cincinnati, OH (US); William R. Merz, Fairfield, OH (US); W. Howard Newton, Cincinnati, OH (US)

(73) Assignee: Rolcon, Inc., Cincinnati, OH (US)

( * ) Notice: Subject to any disclaimer, the term of this patent is extended or adjusted under 35 U.S.C. 154(b) by 0 days.

(21) Appl. No.: 09/933,186

(22) Filed: Aug. 22, 2001

(65) Prior Publication Data

US 2002/0074208 A1 Jun. 20, 2002

Related U.S. Application Data

(63) Continuation-in-part of application No. 29/134,249, filed on Dec. 19, 2000.

(51) Int. Cl.[7] .............................. B65G 13/00; B65G 23/04
(52) U.S. Cl. ...................... 193/35 R; 193/37; 198/835
(58) Field of Search ................................. 198/831, 832, 198/835, 816, 787; 193/35 R, 37

(56) References Cited

U.S. PATENT DOCUMENTS

| | | | | |
|---|---|---|---|---|
| 2,622,720 A | * | 12/1952 | Lorig | 198/787 |
| 3,258,097 A | * | 6/1966 | Wahl | 193/37 |
| 4,896,758 A | * | 1/1990 | Hoszowski | 193/37 |
| 5,988,362 A | | 11/1999 | Nakamura et al. | |

* cited by examiner

*Primary Examiner*—Christopher Ellis
*Assistant Examiner*—Gene O. Crawford
(74) *Attorney, Agent, or Firm*—Jacox, Meckstroth & Jenkins

(57) ABSTRACT

A curved section of a roller conveyor includes a plurality of conveyor roller assemblies each formed by an elongated rigid cylindrical base tube with a bearing and stub axle unit mounted on each end portion of the base tube. The stub axle is spring biased and has a slightly resilient outer surface and a metal core pin. A tapered tubular sleeve of plastics material is mounted on an outer end portion of the base tube with the large end of the sleeve adjacent the outer end of the base tube. Preferably, the sleeve extends axially less than 50% of the length of the base tube and has a press-fit on the base tube with a radial pin locking the sleeve to the base tube.

11 Claims, 1 Drawing Sheet

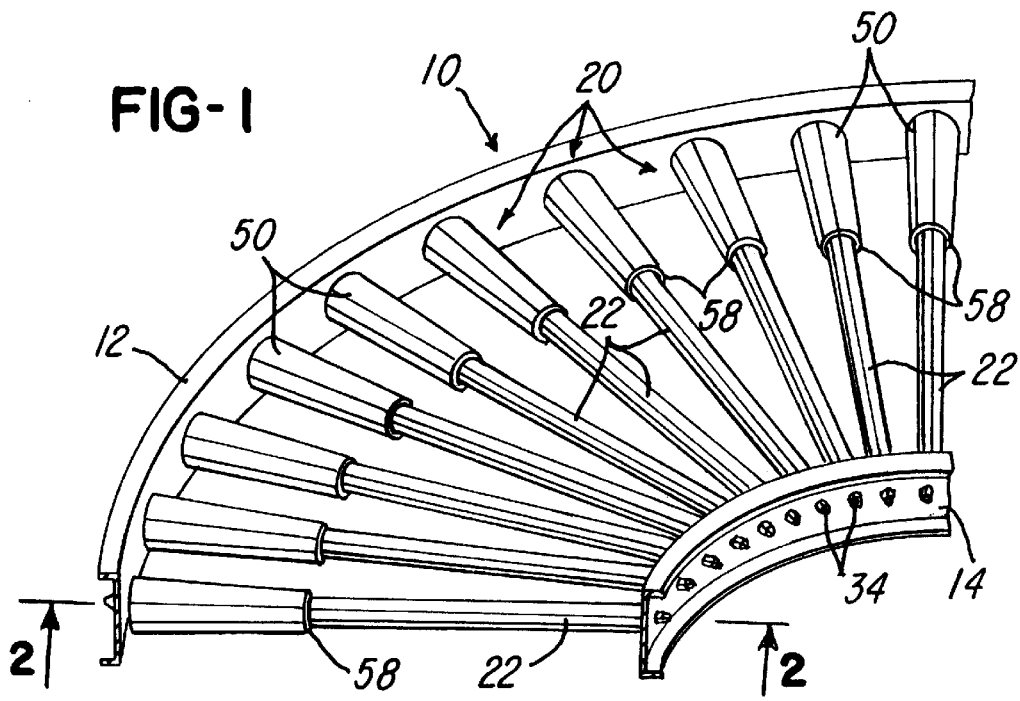
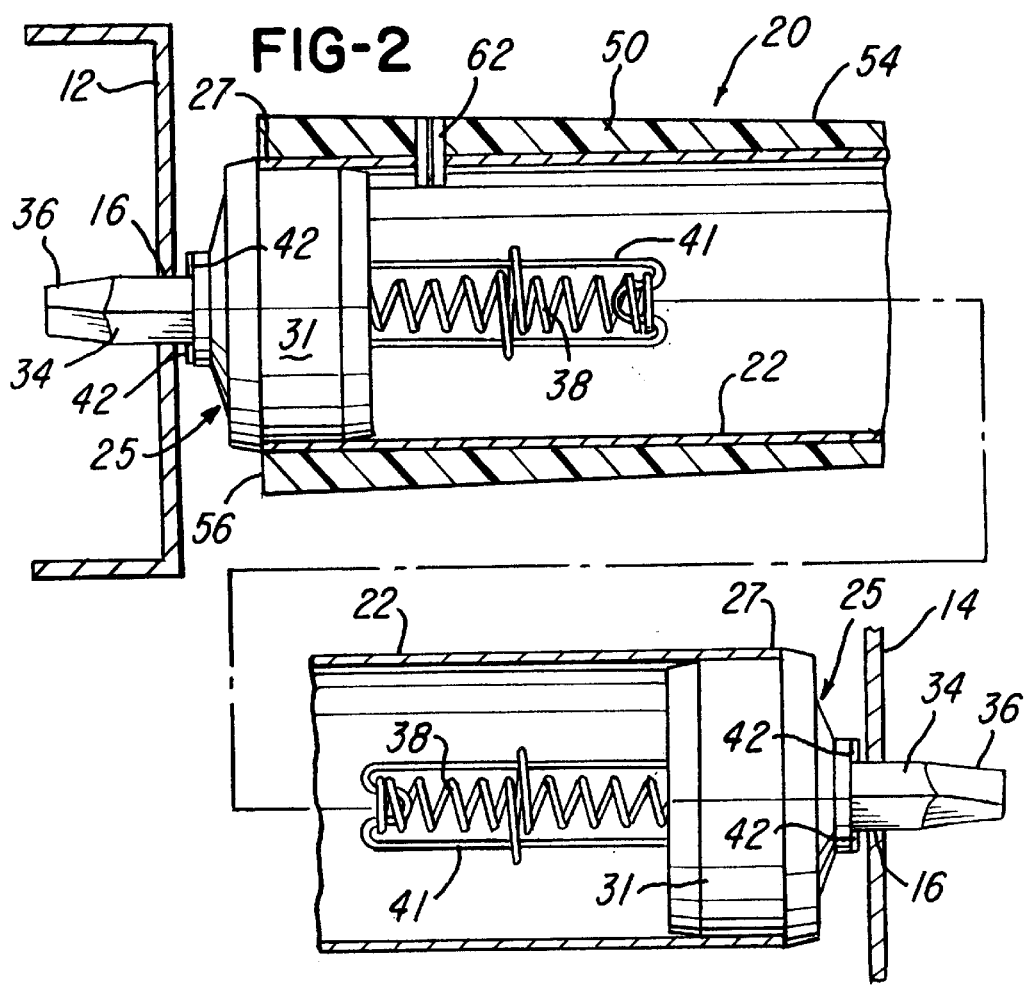

CONVEYOR ROLLER WITH TAPERED SLEEVE ASSEMBLY

RELATED APPLICATION

This application is a continuation-in-part of application Ser. No. 29/134,249, filed Dec. 19, 2000.

BACKGROUND OF THE INVENTION

This invention relates to a conveyor roller assembly mounted on a curved section of a conveyor frame and wherein each conveyor roller has a tapered outer surface, for example, of the general type disclosed in U.S. Pat. No. 5,988,362. Such a conveyor roller assembly is used to move packages around a curved section of a conveyor frame. Commonly, each conveyor roller includes a tapered steel tube having a tapered outer surface extending the full length of the tube. Such a tapered tube is expensive to produce and requires different bearing assemblies for supporting opposite ends of each tapered tube so that the tube is free to rotate. In addition, substantial time is required to install and/or replace a conventional tapered roller conveyor tube within the curved frame sections.

SUMMARY OF THE INVENTION

The present invention is directed to a conveyor roller assembly for use in a curved section of a conveyor frame and which substantially reduces the cost of manufacturing the roller assembly as well as substantially reduces the weight of the assembly. The weight reduction is highly desirable in that it reduces shipping and handling costs and efforts. In addition, the conveyor roller assembly of the invention reduces the operating noise level of a curved section of a conveyor and extends the service life of a curved conveyor section. The conveyor roller assembly of the invention further eliminates the need for a package distribution center from maintaining an inventory of expensive conventional tapered steel conveyor rollers as has been required for servicing a curved conveyor section.

It has been determined that it is not essential for a tapered conveyor roller in a curved conveyor section to have a uniform taper from the outer end of the roller to the inner end in order to allow packages to move around a curve without changing orientation of the packages with respect to the roller conveyor. Thus in accordance with a preferred embodiment of the invention, an elongated rigid cylindrical base tube, such as a conventional steel tube having a uniform outer diameter, is supported for free rotation by a corresponding bearing and axle unit within each end portion of the base tube. A tubular sleeve of a plastics material, such as polypropylene having a slightly resilient outer surface, has an inner cylindrical surface which is press-fitted onto an end portion of the base tube. The plastic sleeve has a tapered outer surface and extends less than fifty percent of the length of the base tube and preferably, approximately one third the length of the base tube. The tapered sleeve has its largest diameter end positioned adjacent the outer end of the base tube, and the inner end of the tapered sleeve has an outer diameter only slightly greater than the outer diameter of the base tube.

Other features and advantages of the invention will be apparent from the following description, the accompanying drawing and the appended claims.

BRIEF DESCRIPTION OF THE DRAWING

FIG. 1 is a fragmentary perspective view of a curved roller conveyor section including a plurality of conveyor roller assemblies each constructed in accordance with the invention; and FIG. 2 is an axial section of a conveyor roller assembly as taken generally on the line 2—2 of FIG. 1 and with a center portion of the roller assembly broken away.

DESCRIPTION OF THE PREFERRED EMBODIMENT

FIG. 1 illustrates a curved roller conveyor section 10 including an outer curved frame member or channel 12 and a concentric inner curved frame member or channel 14 each of which has a series of longitudinally spaced hexagonal holes 16. Extending between the inner and outer frame members 12 and 14 are a series or plurality of conveyor roller assemblies 20 which are arranged in radial spoke-like positions with respect to the part-circular and concentric frames 12 and 14. The arcuate frames 12 and 14 may extend any desired length, but commonly extend either 90° or 180°. As mentioned above, when packages are being conveyed by the roller conveyor 10, it is desirable for each article or package to maintain its orientation as originally deposited on the roller conveyor so that an identification label or bar code on each article or package may be accurately scanned while the article or package is moving along the conveyor, especially on a sorting conveyor.

Referring to FIG. 2, each of the conveyor roller assemblies 20 includes a rigid or steel base tube 22 having uniform inner and outer diameters. Usually the outer diameter of the base tube 22 is about 1.625 inches or 1.9 inches. The base tube 22 is supported for free rotation by a pair of bearing and axle assemblies or units 25 which are connected or inserted into opposite end portions of the base tube 22. The units 25 are positively secured to the tube by rolling the tip end portions 27 of the base tube 22 into corresponding grooves (not shown) within corresponding plastic bushings 31 of the bearing and axle units 25. Preferably, each of the bearing and axle assemblies or units 25 is constructed as disclosed in U.S. Pat. No. 6,161,673 which issued to the assignee of the present invention, and the disclosure of which is incorporated herein by reference.

Each bearing and axle unit 25 may also incorporate the improvements disclosed in pending U.S. patent application Ser. No. 09/740,173, filed Dec. 18, 2000, the disclosure of which is also incorporated herein by reference. As disclosed in this patent and patent application, each bearing and axle unit 25 also includes a hexagonal stub axle 34 having a slightly tapered and twisted hexagonal end portion 36 which guides the axle 34 into the mating hexagonal hole 16 within the supporting frame member. Each of the stub axles 34 has a resilient outer surface and a reinforcing metal core pin, as disclosed in the above-mentioned application. Each stub axle 34 is retractable within the bushing 31 against the bias of a compression spring 38, and the spring 38 is supported by a formed metal strip 41 having right angle outer tabs or tip portions 42. The detailed construction of the unit 25 is disclosed in the above-mentioned patent application.

Each of the conveyor roller assemblies 20 also includes a tubular sleeve assembly or sleeve 50 which is preferably one-piece and molded of a slightly resilient plastics material such as polypropylene. The sleeve 50 has a cylindrical inner surface which has a diameter substantially the same as the diameter of the outer cylindrical surface of the base tube 22, and preferably has a press-fit engagement with the base tube 22. The sleeve 50 has a uniformly tapered outer surface 54 with the largest diameter end 56 adjacent or substantially flush with the corresponding outer end of the base tube 22. The sleeve 50 has its smallest or opposite inner end 58 (FIG. 1) with a diameter only slightly larger than the outer diameter of the base tube 22. The inner end 58 of the sleeve 50 may also have a short taper without sacrificing any performance of each conveyor roller assembly 20.

As shown in FIG. 1, the axial length of each sleeve 50 is less than one half the length of the base tube 22 and is preferably about one third of the length of the base tube 22. In addition to the press-fit mounting of each sleeve 50 on its corresponding base tube 22, one or more short roll pins 62 extend radially through corresponding aligned holes within the sleeve 50 and base tube 22 to lock the sleeve and tube together and prevent any shifting or axial movement of the sleeve 50 on the base tube 22.

From the drawing and the above description, it is apparent that the conveyor roller assembly constructed in accordance with the present invention, provides desirable features and advantages. As one important advantage, it has been found that a plurality of roller assemblies 20 function to convey articles or packages around a curve in the same manner as a roller tapered along its full length such as illustrated in above U.S. Pat. No. 5,988,362. On the other hand, the cost of producing a roller assembly 20 with a base tube 22 of uniform diameter and a tapered sleeve 50 is substantially lower since the base tube 22 of a roller assembly 20 may be standard steel tubing, and the plastic sleeve 50 may be easily and quickly produced by injection molding. In addition, the roller assembly 20 is substantially lighter in weight, for example, up to thirty percent lighter than a conventional steel conveyor tube having a uniform taper along its full length.

The roller assembly 20 further eliminates the need for a package distribution center to maintain an inventory of expensive conventional tapered rollers for servicing. That is, it is only necessary to maintain an inventory of plastic sleeves 50 which are mounted on a standard steel base tube 22 as commonly used in a straight length of roller conveyor. It has also been found that the slightly resilient outer surfaces of the tapered plastic sleeves 50 and the bearing and axle units 25 significantly reduce the noise level of a curved conveyor section and extend the service life of the section before any roller assemblies 20 need to be replaced. The lower weight of the roller assembly 20 also reduces freight or shipping costs and is less fatiguing for the assembly and servicing personnel who handle the roller assemblies. As another advantage, the retractable stub axles 34 of each bearing and axle unit 25 also significantly reduces the time required for installing a roller assembly 20, both during the original construction of a conveyor system and for replacing a roller assembly 20 during servicing.

While the form of conveyor roller assembly herein described constitutes a preferred embodiment of the invention, it is to be understood that the invention is not limited to this precise form of assembly, and that changes may be made therein without departing from the scope and spirit of the invention as defined in the appended claims. For example, it is within the scope of the invention, but not preferred, to mold a sleeve assembly or sleeve 50 in sections which are progressively smaller in diameter and are positioned on the base tube 22 in either adjacent or spaced relation.

What is claimed is:

1. A conveyor roller assembly adapted to be mounted on a curved section of a conveyor frame, comprising an elongated rigid cylindrical base tube having opposite end portions and a substantially uniform outer diameter, a bearing and non-rotating axle assembly connected to each said end portion of said base tube and supporting said base tube for rotation relative to said axle, an elongated one-piece sleeve of plastics material having a generally cylindrical inner surface mounted on said base tube and a tapering outer surface.

2. A roller assembly as defined in claim 1 wherein said sleeve extends axially less than fifty percent of an axial length of said base tube.

3. A roller assembly as defined in claim 1 wherein said sleeve extends axially on said base tube about one third of an axial length of said base tube.

4. A roller assembly as defined in claim 1 and including at least one lock pin extending generally radially through said sleeve and said base tube for locking said sleeve to said base tube.

5. A roller assembly as defined in claim 1 wherein said sleeve has a press fit attachment to said base tube.

6. A roller assembly as defined in claim 1 wherein said tapered sleeve has a large end adjacent an end of said base tube.

7. A roller assembly as defined in claim 1 wherein said sleeve has a small end having a diameter slightly larger than said outer diameter of said base tube.

8. A roller assembly as defined in claim 1 wherein said bearing and axle assembly comprises a depressible spring biased stub axle having a resilient outer surface and a metal core.

9. A conveyor roller assembly adapted to be mounted on a curved section of a conveyor frame, comprising an elongated rigid cylindrical base tube having opposite end portions and a substantially uniform outer diameter, a corresponding bearing and depressible spring biased non-rotating stub axle connected to each said end portion of said base tube and supporting said base tube for rotation relative to said stub axles, an elongated sleeve of plastics material mounted on said base tube and having a tapering outer surface, and said sleeve extends axially less than fifty percent of an axial length of said base tube.

10. A roller assembly as defined in claim 9 and including at least one lock pin extending generally radially through said sleeve and said base tube for locking said sleeve to said base tube.

11. A roller assembly as defined in claim 9 wherein each said stub axle has a resilient outer surface and a metal core.

* * * * *